C. B. FRECK.
CLOSET BOWL.
APPLICATION FILED AUG. 21, 1916.
1,271,026.
Patented July 2, 1918.
4 SHEETS—SHEET 1.
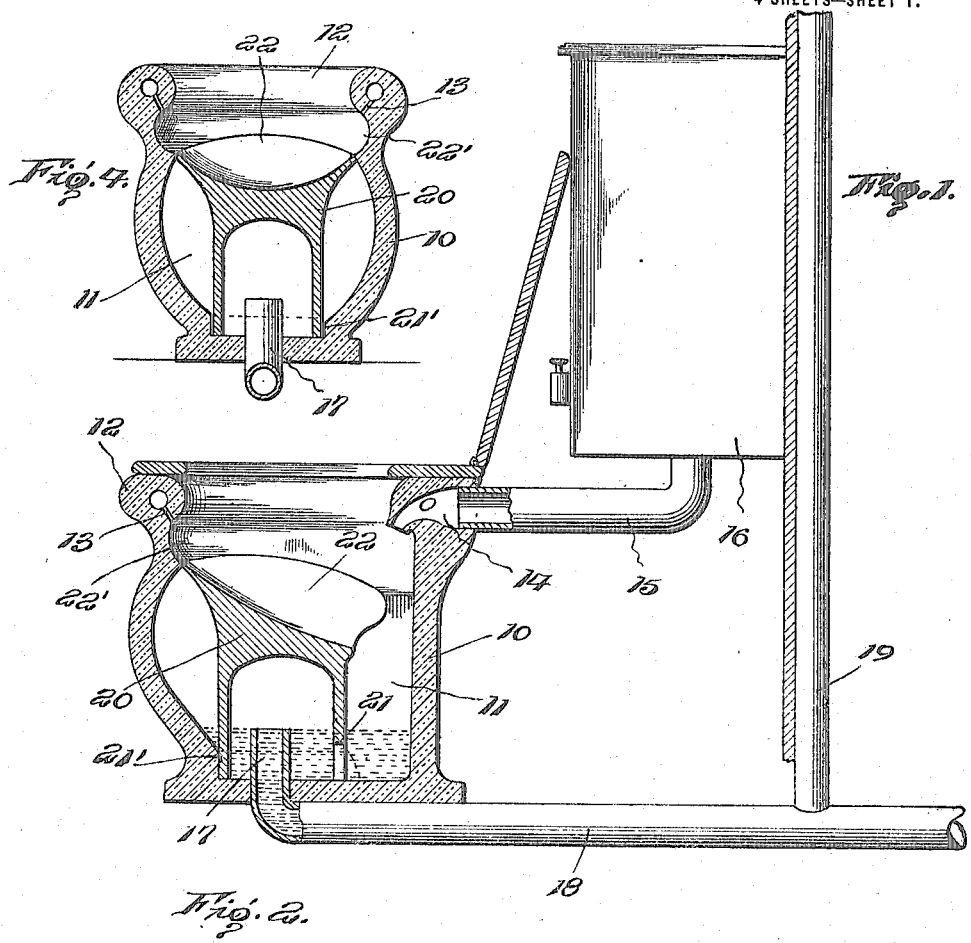
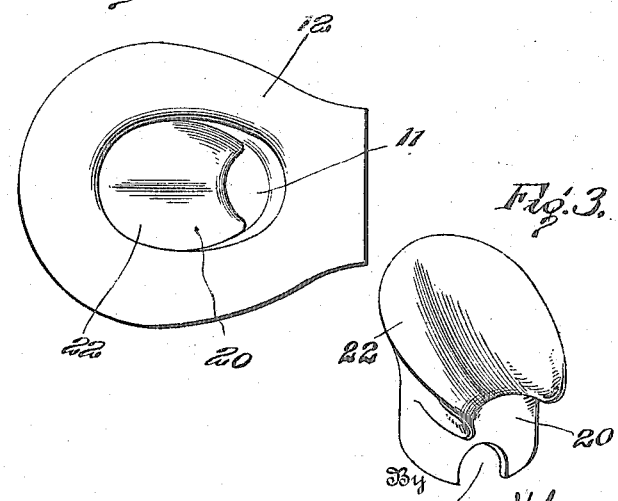
Inventor
C. B. Freck.
By
Attorneys C. B. FRECK.
CLOSET BOWL.
APPLICATION FILED AUG. 21, 1916.
1,271,026.
Patented July 2, 1918.
4 SHEETS—SHEET 2.
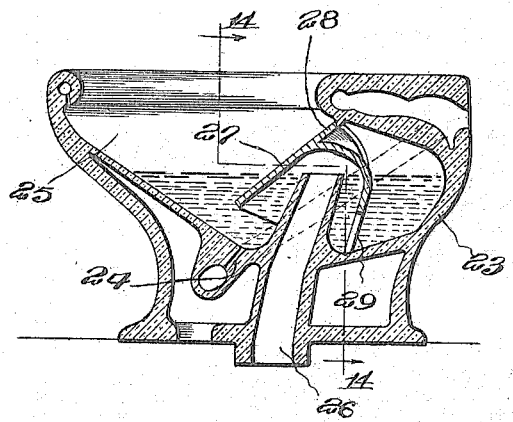
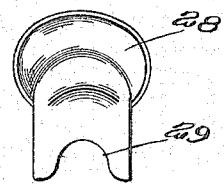
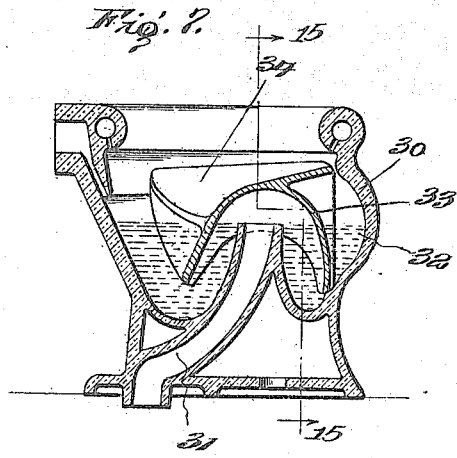
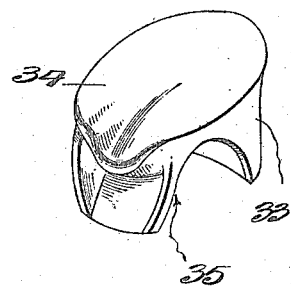
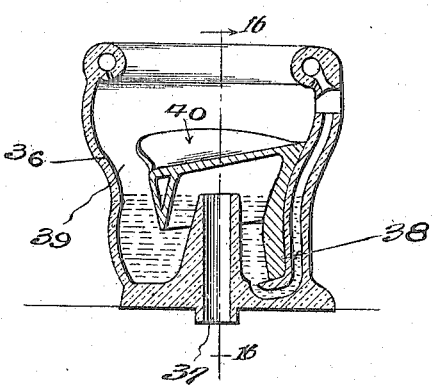
Inventor
C. B. Freck.
By
[signature], Attorneys.

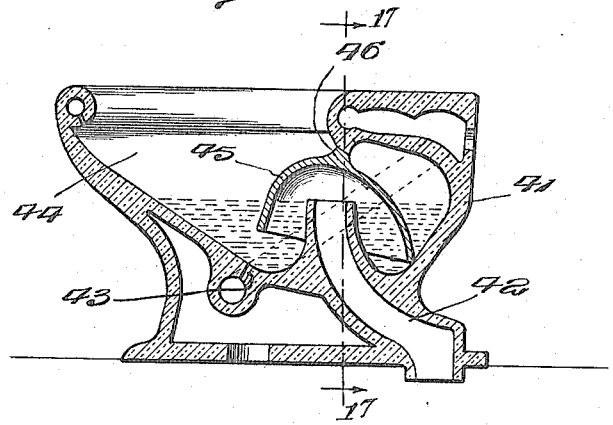
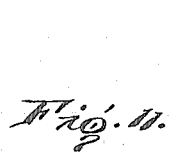
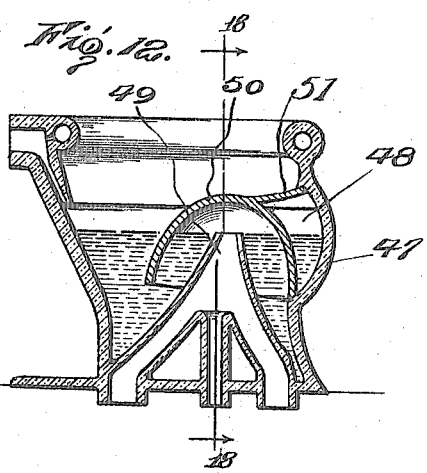
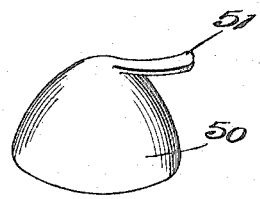

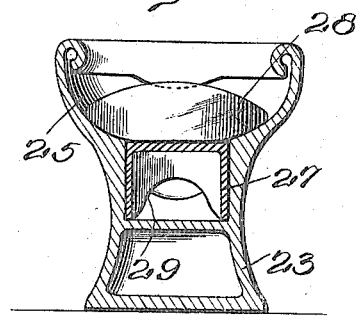
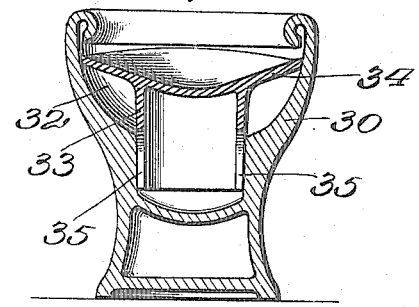
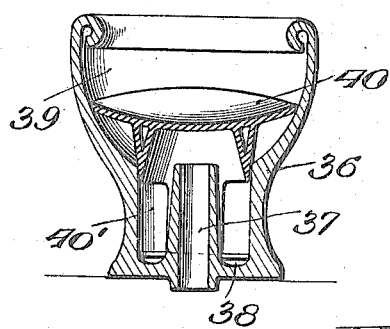
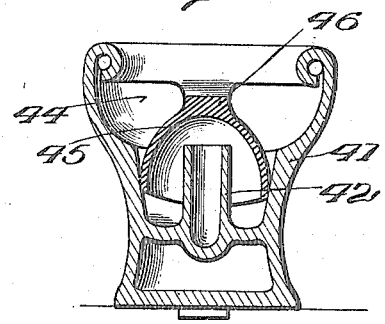
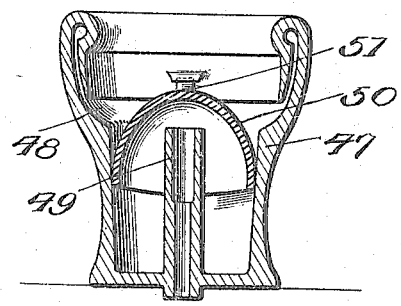

UNITED STATES PATENT OFFICE.

CHARLES B. FRECK, OF ASHEVILLE, NORTH CAROLINA.

CLOSET-BOWL.

1,271,026.  Specification of Letters Patent.  Patented July 2, 1918.

Application filed August 21, 1916. Serial No. 116,119.

*To all whom it may concern:*

Be it known that I, CHARLES B. FRECK, a citizen of the United States, residing at Asheville, in the county of Buncombe and State of North Carolina, have invented certain new and useful Improvements in Closet-Bowls, of which the following is a specification.

This invention contemplates an improved closet bowl and trap and has as its primary object to provide a construction wherein the bell portion of the trap will be removable so that free access may be had to the outlet pipe or conduit for the bowl.

The invention has as a further object to provide a trap and bowl of such construction that a greater amount of water will normally be retained within the bowl than is usually the case so that such water will be deeper and wherein the trap will act to siphon the water from the bowl when the bowl is flushed in the usual manner.

And a still further object of the invention is to provide an arrangement which may be readily embodied in the construction of closet bowls, as now upon the market.

Other and incidental objects will appear as the description proceeds and in the drawings wherein I have illustrated the preferred embodiment of the invention and wherein similar reference characters designate corresponding parts throughout the several views, Figure 1 is a fragmentary sectional view showing the bowl and trap in connection with a conventional type of flush tank, Fig. 2 is a top plan view particularly showing the disposition of the bell portion of the trap within the bowl, Fig. 3 is a perspective view of the bell portion of the trap removed, Fig. 4 is a transverse sectional view showing the annular seat in the bowl for receiving the bell portion of the trap, Fig. 5 is a sectional view of a slightly modified form of the invention as used in connection with a bowl having a siphon jet, Fig. 6 is a rear elevation of the bell portion of the trap used in connection with such bowl, Fig. 7 is a sectional view showing a further modification of the invention as used in connection with a bowl similar to that shown in Fig. 5 but without the siphon jet, Fig. 8 is a detail perspective view of the bell portion of the trap employed with the bowl shown in Fig. 7, Fig. 9 is a sectional view of a further modification of the invention as used in connection with a bowl having a siphon jet at the rear thereof, Fig. 10 is a similar view showing a still further modification of the invention as used in connection with a bowl having a rear outlet and provided with a siphon jet similar to the bowl shown in Fig. 5, Fig. 11 is a detail view of the bell portion of the trap used with the bowl shown in Fig. 10, Fig. 12 is a sectional view showing a still further modification of the invention as used in connection with a bowl having front, central and rear outlets, Fig. 13 is a detail view of the bell portion of the trap used with the bowl in Fig. 12, Fig. 14 is a transverse sectional view taken on the line 14—14 of Fig. 5 and looking in the direction of the arrows.

Fig. 15 is a transverse sectional view taken on the line 15—15 of Fig. 7 and looking in the direction of the arrows.

Fig. 16 is a similar view taken on the line 16—16 of Fig. 9 and looking in the direction of the arrows.

Fig. 17 is a transverse sectional view taken on the line 17—17 of Fig. 10 and looking in the direction of the arrows, and Fig. 18 is a similar view taken on the line 18—18 of Fig. 12 and looking in the direction of the arrows.

In carrying out the invention, I employ a bowl 10 of approved design and construction. This bowl is provided with a basin 11 and is formed with the usual hollow roll rim 12 upon which rests the seat. Leading into the basin 11 from the interior of the roll rim 10 are a plurality of openings 13 and communicating with the said roll rim at the rear of the bowl is an inlet 14 in which is fitted a pipe 15 connected with the conventional type of flush tank 16 so that water from the said tank will be distributed through the openings 13 around the walls of the bowl at its upper extremity.

Projecting upwardly through the bottom wall of the bowl is an outlet pipe or conduit 17 which is arranged adjacent the forward side of the bowl and terminates above the said bottom wall a distance corresponding to the depth it is desired to have the water normally stand within the bowl. Connected in any suitable manner to the outlet pipe 17 is a pipe 18 which leads to the sewer and is provided with the usual ventilating pipe 19.

Removably fitted in the basin 11 of the bowl is a bell portion 20 coöperating with the outlet pipe 17 to form a trap. This bell portion is hollow to receive the inner end of the said outlet pipe and upon the rear side thereof, the wall of the bell portion is cut away at its lower extremity to provide a siphon opening 21. Upon the flushing of the bowl, water will, in the well known manner, pass downwardly within the basin and thence through the opening 21 to the interior of the trap and thence out through the conduit 17 by siphoning action.

The bell portion 20, at its lower extremity, rests upon the bottom wall of the basin and the side walls of the basin are formed to provide an annular seat or shoulder 21' snugly receiving or fitting around the lower extremity of the trap so that the said bell portion will thus be held in relatively fixed position in the bowl with respect to the outlet pipe 17. The bell portion, at its upper extremity, is flared to provide an upwardly and outwardly curved flange 22 which, at its periphery, seats against the sides of the basin 11 with the upper face of the bell portion sloping downwardly and rearwardly toward the rear side of the basin. Upon the inner side of the bell portion, the flange 22 is cut away above the opening 21 so that excrement falling upon the bell portion will be directed into the basin. Formed in the sides of the bowl 10 to surround the flange 22 of the bell portion is an offset or water deflecting shoulder 22'. This shoulder terminates at its lower extremity immediately at the periphery of the flange 22 and slopes toward the said flange to direct the water flowing over the shoulder from the openings 13 onto the upper face of the bell portion for thoroughly cleansing the said bell portion when the bowl is flushed.

As will now be clear, the inner extremity of the outlet pipe 17 may be caused to extend upwardly into the basin 11 any approved distance for varying the depth of the water normally retained within the bowl and in this way I provide an arrangement wherein water standing within the bowl will be deeper than is now ordinarily usual with conventional types of bowls. Should the outlet pipe become clogged, the bell portion 20 may be readily removed from the bowl when unobstructed access may be had to the said outlet so that it may be easily cleaned. Obviously, this provides an advantageous arrangement since in order to gain access to the outlet for the bowl, it will be unnecessary to displace the bowl or detach the connections therefor with the tank 16.

In Fig. 5 of the drawings, I have shown a slight modification of the invention as used in connection with a bowl 23 having a siphon jet 24. Leading into the basin 25 of the bowl is a central outlet pipe or conduit 26 adapted for attachment to a suitable pipe leading to the sewer. This pipe 26, at its inner extremity, projects upwardly into the basin 25 and the discharge terminal of the jet 24 is arranged a slight distance in advance of the said pipe, this jet communicating with the inlet of the bowl in the usual manner. Fitting over the inner extremity of the pipe 26 to form a trap is the bell portion 27 which rests upon the bottom of the basin 25 and at its upper extremity is provided with a flange 28 to engage the rear wall of the bowl for supporting the bell portion in position. The wall of the bell portion adjacent its lower extremity is cut away to provide a siphon opening 29 so that when the bowl is flushed, water will pass through the said opening into the bell portion to be siphoned through the outlet 26. It will be seen that the bell portion of this modification provides a very efficient construction for a bowl of the character disclosed while the said bell portion may be easily removed for cleaning the outlet 26.

In Fig. 7 of the drawings, I have illustrated a further modification of the invention as used in connection with a bowl 30 somewhat similar to that shown in Fig. 5 but without the siphon jet and having its outlet pipe or conduit 31 passing out at the rear side of the bowl. The bowl is formed with a basin 32 and the inner extremity of the pipe 31 projects upwardly into this basin. Fitting over the inner terminal of the said pipe to coöperate therewith and form a trap is the bell portion 33 of the trap, the upper face of which is flared to provide a flange 34 sloping upwardly and outwardly toward the sides of the basin to engage therewith. The upper face of the bell portion is inclined downwardly and rearwardly toward the rear side of the bowl as in the instance of the trap of the preferred form of the invention and for a similar purpose while the side walls of the bell portion are cut away to provide siphon openings 35. It will be seen that this modification provides a very convenient arrangement for the type of bowl illustrated and the bell portion may be easily removed for cleaning the outlet pipe 31 of the bowl.

In Fig. 9 of the drawings, I have illustrated a further modification of the invention as used in connection with a bowl 36 having a centrally located outlet pipe or conduit 37 and provided at the rear side thereof, with a siphon jet 38. The pipe 37 projects upwardly into the basin 39 of the bowl and removably fitted within the basin over the inner terminal of the said pipe to form a trap is a bell portion 40. This bell portion is, at its rear side, formed with an integral leg 40' resting upon the bottom of the bowl to support the said bell portion. The construction of this modification is, as will be observed, particularly adapted for a bowl having a siphon jet at the rear side thereof, as in the instance illustrated.

In Fig. 10 of the drawings, I have illustrated a still further modification of the invention as used in connection with a bowl 41 having an outlet pipe or conduit 42 passing out at the rear side of the bowl and provided with a siphon jet 43 in advance of the said pipe. The bowl is formed with a basin 44 and the inner extremity of the pipe 42 projects upwardly into the said basin. Removably fitted over the inner terminal of the pipe 42 to form a trap is a bell portion 45 which, upon the upper side thereof, is formed with a flange 46 to engage with the rear wall of the bowl for supporting the bell portion in position with the bell portion resting at its lower edges against the side walls of the bowl. The jet 43 communicates with the inlet of the bowl in the usual manner and it will be seen that this modification provides a convenient arrangement for a bowl of the type illustrated.

In Fig. 12 of the drawings, I have illustrated a still further modification of the invention as used in connection with a bowl 47 having front, central and rear outlets or conduits which, at their inner extremities, project upwardly into the basin 48 of the bowl and merge into a common terminal 49. Fitted over the terminal 49 to form a trap is a bell portion 50 resting at its lower edges, upon the sides of the bowl and provided, at its upper extremity, with a laterally projecting flange 51 engaging the wall of the bowl at the forward side thereof for supporting the bell portion in position. This modification provides, as will be observed, a convenient arrangement for the particular type of bowl illustrated in this figure of the drawing.

Having thus described my invention, what I claim and desire to secure by Letters Patent is:

1. A device of the character described including a bowl provided with a shoulder, an outlet pipe projecting into the bowl, and a bell portion resting upon the bowl over the inner extremity of the said pipe to coöperate therewith and form a trap with the said shoulder engaging the lower extremity of the bell portion and holding the bell portion against lateral displacement relative to the said pipe.

2. A device of the character described including a bowl, an outlet pipe projecting into the bowl, and a bell portion having a flared portion engaging the sides of the bowl with the bell portion fitting over the inner extremity of said pipe to coöperate therewith and form a trap, the said bell portion resting at its lower extremity upon the bottom of the bowl to be supported thereby.

3. A device of the character described including a bowl provided with a water deflecting shoulder, an outlet pipe projecting into the bowl, and a bell portion arranged within the bowl over the inner extremity of said pipe to coöperate therewith and form a trap with the upper extremity of the bell portion terminating adjacent said shoulder whereby water flowing over the said shoulder will be directed onto the upper end of the bell portion.

4. A device of the character described including a bowl having a water deflecting shoulder formed in the wall thereof adjacent the upper extremity of the bowl, an outlet pipe projecting through the bottom wall of the bowl, and a bell portion seating upon the said bottom wall over the inner extremity of the said pipe to coöperate therewith and form a trap, the said bell portion being provided with a flange at its upper extremity terminating adjacent the inner extremity of said shoulder whereby water flowing over the said shoulder will be directed onto the upper end of the bell portion.

5. A device of the character described including a bowl, an outlet pipe projecting into the bowl, and a bell portion resting at its lower extremity within the bowl over the said outlet pipe to coöperate therewith and form a trap, the said bell portion being formed with an inclined upper face sloping from the forward side of the bowl toward the rear side thereof.

6. A device of the character described including a bowl, an outlet pipe projecting into the bowl, and a bell portion resting at its lower extremity within the bowl over the said outlet pipe to coöperate therewith and form a trap, the said bell portion being formed at its upper extremity with a flared portion seating against the side walls of the bowl with the said flared portion cut away at the inner vertical side of the bell portion.

7. A device of the character described including a bowl, an outlet pipe projecting into the bowl, and a bell portion resting at its lower extremity within the bowl over the said outlet pipe to coöperate therewith and form a trap, the said bell portion being formed with an inclined upper face sloping toward the bottom of the bowl.

8. The combination with a siphonic closet bowl having a hollow rim and provided with an inlet pipe communicating interiorly of the rim for distributing water from the rim around the sides of the bowl, and an outlet pipe projecting upwardly within the bowl, of a bell portion fitted within the bowl over the said outlet pipe to coöperate therewith and form a trap with the upper extremity of the bell portion disposed below said rim.

In testimony whereof I affix my signature.

CHARLES B. FRECK. [L. S.]

Copies of this patent may be obtained for five cents each, by addressing the "Commissioner of Patents, Washington, D. C."